INVENTOR
DONALD L. FETTERMAN

United States Patent Office 3,471,337
Patented Oct. 7, 1969

3,471,337
FUEL CELL REJUVENATION CONTROL MEANS
Donald L. Fetterman, Alexandria, Va., assignor to the United States of America as represented by the Secretary of the Army
Filed Jan. 26, 1967, Ser. No. 612,302
Int. Cl. H01m 27/02
U.S. Cl. 136—86                    3 Claims

ABSTRACT OF THE DISCLOSURE

This invention relates in general to electrical energy source regulation means and in particular to means for rejuvenation of selected energy sources, such as fuel cells, having a voltage-load function characteristic curve which must be maintained at all load levels for optimum performance of the system. In this invention, electronic control means adapted to sense output voltage and load current serve to actuate rejuvenation means, as appropriate, to maintain the voltage level per each load point on the characteristic curve.

BACKGROUND OF THE INVENTION

Energy sources of the fuel cell variety are characterized by an output voltage curve which declines in accordance with load current. That is, with a heavy current load on the fuel cell, a need for active fluid rejuvenation arises but the degree of rejuvenation (amount of fluid and time period required) is determined with respect to a lesser voltage level since the magnitude of the voltage which must be maintained for optimum performance decreases as the loading increases. Thus, standard voltage regulators which are sensitive to deviations from one predetermined voltage level cannot be employed to rejuvenate energy sources of the fuel cell variety. In predictable circumstances, it has been found that a controlled periodic rejuvenation is generally sufficient to maintain the voltage-work function characteristic curve. In other circumstances, it is necessary to employ relatively expensive means for monitoring ambient conditions, as well as voltage and current levels and to continuously compute active fluid rejuvenation needs.

Magnetic saturable core devices have been devised for fuel cell rejuvenation and these devices have found some limited utility but, generally, they are not desirable for operation in magnetic field isolation applications nor are they desirable in applications embodying other magnetic field devices wherein extraneous magnetic fields may interfere with the control function.

SUMMARY OF THE INVENTION

It has been recognized that a low cost reliable means for monitoring fuel cell operation and for controlling rejuvenation of the fuel cell on demand which is not subject to magnetic field influence is needed and the present invention has evolved to meet this need.

DESCRIPTION OF THE PREFERRED EMBODIMENT

Figure 1:
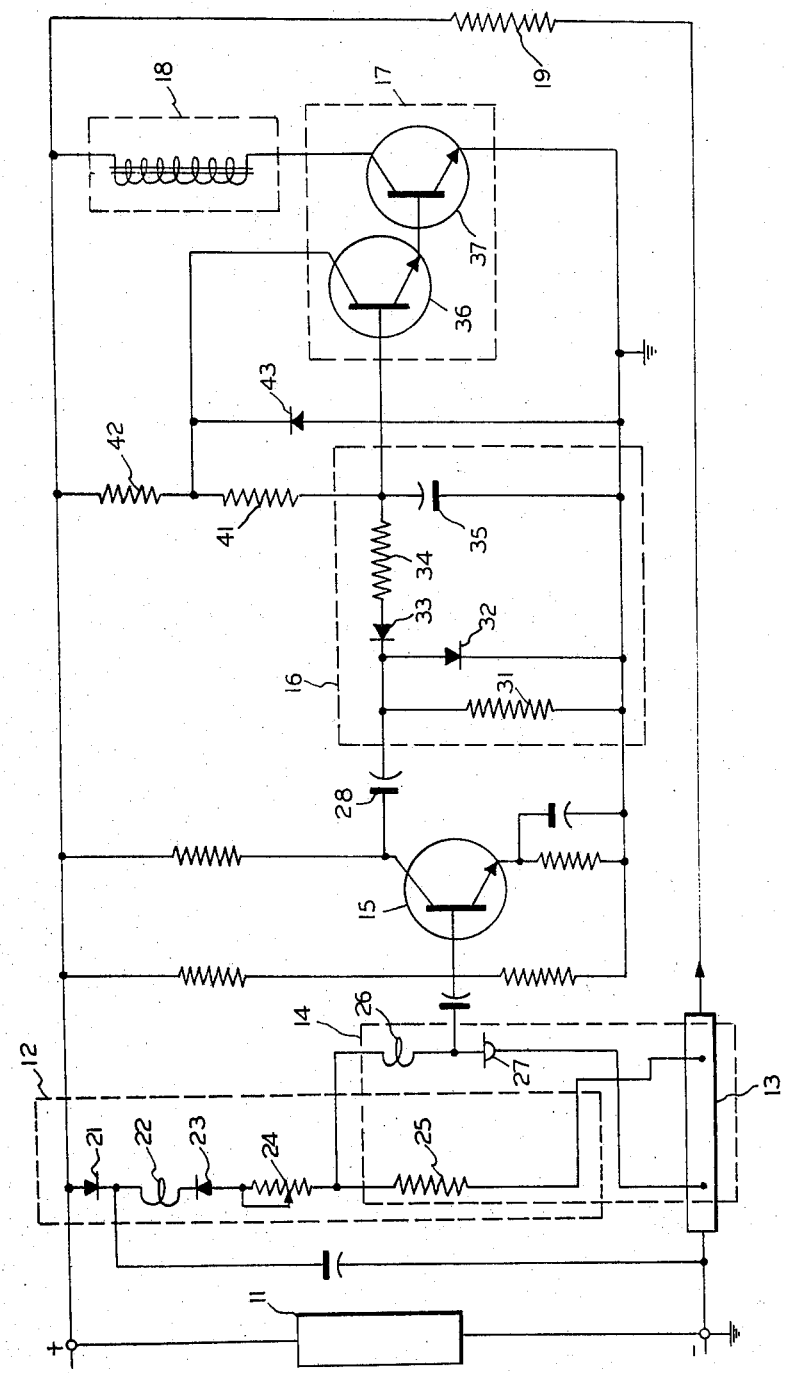
FIGURE 1 is a schematic showing of one embodiment of the invention in a typical application involving fuel cell rejuvenation under operational load.
Figure 2:
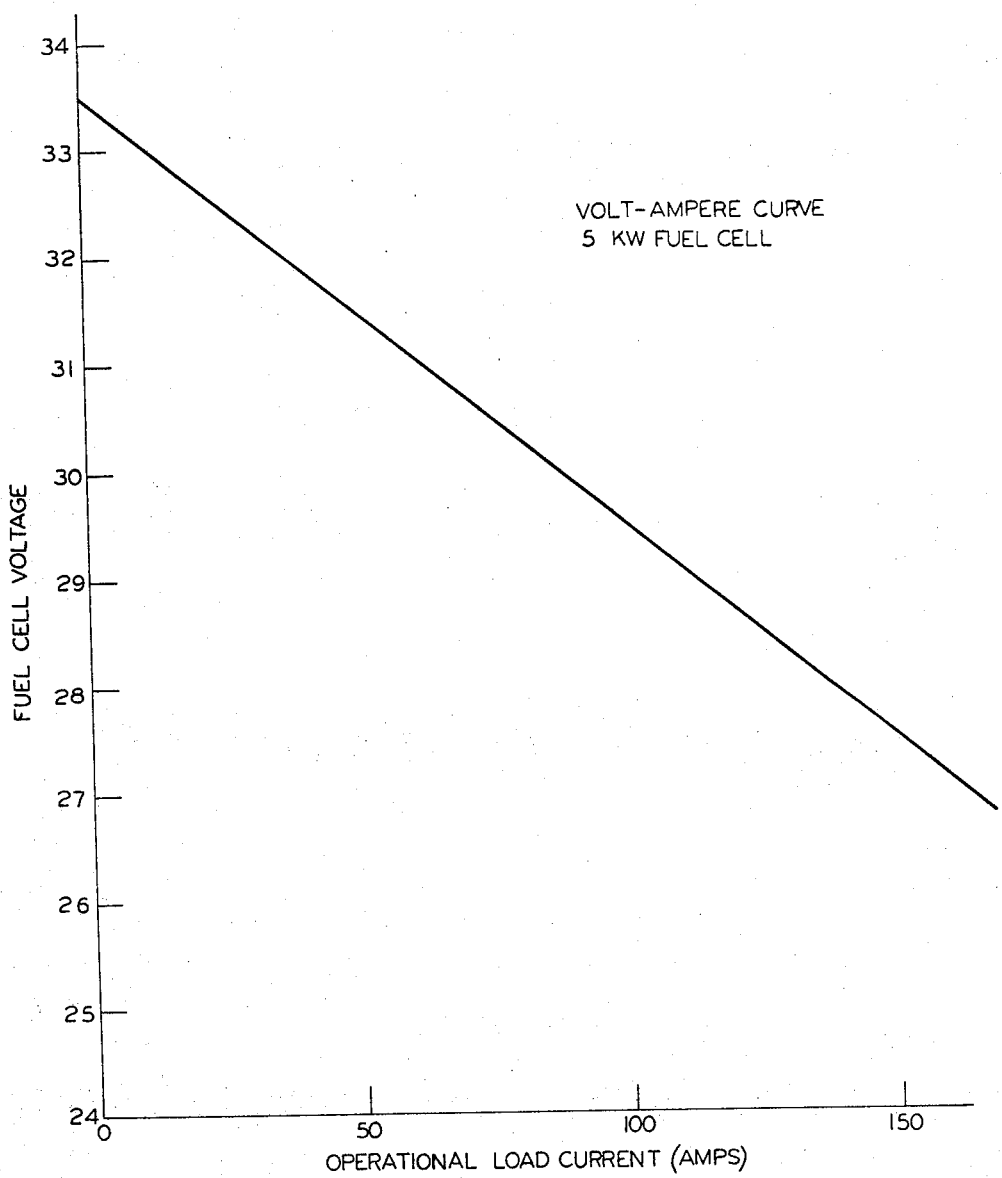
FIGURE 2 is a voltage-load function characteristic curve for a typical 5 kw. fuel cell suitable for adaptation in accordance with this invention.

As shown in FIGURE 1, the device of this invention is connected across the positive and negative terminals of the fuel cell energy source 11. In essence, the embodiment of FIGURE 1 comprises a voltage divider network, indicated at 12, a series load impedance 13, a trigger oscillator, indicated at 14, an AC amplifier, indicated at 15, a DC restorer, indicated at 16, a power switching means, indicated at 17, and a hydrazine supply solenoid, indicated at 18.

The voltage divider network 12 incorporates a silicon diode 21 which eliminates reverse transient voltage build-up which might result in incorrect triggering, an inductance coil 22 which serves as a choke to suppress spike voltages due to transient currents in the forward direction, a Zener diode 23, which may have an 18–22 volt rating, serves to increase sensitivity of the trigger point, a variable resistance 24 which enables voltage trigger point adjustment and a load resistance 25, which forms a part of the RCL oscillator circuit 14, and thus serves as the voltage sensing resistor. The precision adjustable load impedance 13 is connected in series with the parallel connection of the voltage divider network 12 and the operational load 19 on the energy source 11.

In accordance with the invention, the RCL circuit the capacitance of tunnel diode 27, inductance 26 and resistance 25, are triggered into oscillation when a predetermined voltage, for example, 65 millivolts is developed across the tunnel diode 27 and this oscillatory circuit produces a sine wave output frequency of approximately 10 kc. dependent, of course upon the LC network involved. The voltage divider is adjusted such that the predetermined voltage across resistance 25 is maintained and the oscillator 14 is on when the fuel cell is operating within reasonable limits ($\pm.5$ volt) on its characteristic curve.

When the voltage output decline of the fuel cell exceeds reasonable limits due to a heavy load current, a greater voltage is dropped across the impedance 13 with a consequent reduction in voltage across resistance 25. Thus with a voltage decline, the oscillator 14 shuts off and rejuvenation of the fuel cell is initiated as follows:

In the exemplary embodiment, the output of oscillator 14 is fed through AC amplifier 15, which may have a 20 v. peak to peak output, into a negative DC restorer circuit, resistor 31, diode 32 and capacitor 35 which converts 20 v. AC to a negative DC voltage which controls the conductive state of transistor 36.

It will be appreciated that diodes 32 and 33 resistances 34, 41 and 42, together with Zener diode 43, provide a positive bias for transistor 36 which, in the absence of a negative DC voltage from the DC restorer circuit, maintains transistor 36 in a conductive state. Transistor 36, in turn, controls power transistor 37 such that when transistor 36 is conducting the fuel solenoid 18 is energized.

It is understood, of course, that the fuel solenoid 18 may directly control the flow of hydrazine into the fuel cell as shown, or that any suitable relay control transistor 37 responsive to current flow may be utilized to control the fuel solenoid 18, if desired.

Once the oscillator ceases to oscillate and rejuvenation begins, the hydrazine continues to flow into the fuel cell until such time as the voltage level of the fuel cell increases sufficiently to develop 65 millivolts across the tunnel diode 27, whereupon oscillation commences and the rejuvenation process is interrupted.

It has been found that the device of this invention will maintain the voltage-work functions curve within $\pm.5$ volt of any point thereon and that a single device will function over a susbtantiated portion of the characteristic curve. For example, a 31.5 maximum voltage fuel cell has been operated under load conditions which reduced the fuel cell output voltage to 15 volts with voltage deviation less than .5, plus or minus at any selected point on the characteristic curve.

It is understood, of course, that it is within the purview of this disclosure to modify the device of this invention in accordance with standard practice in the art. In particular, it is not essential to this invention that the output of the oscillator be converted to a DC signal to control a DC voltage responsive switching means and other oscillator output responsive switching means may be employed, if desired. Moreover, various protective means may be deleted or incorporated, if necessary, to accommodate for extraneous interference.

Likewise, the rejuvenation control means of this invention is readily adaptable to any type of energy source having a significant voltage-work function characteristic curve and subject to restoration of output energy level by any additive or conditioning process.

Finally, it is understood that this invention is only limited by the scope of the claims appended thereto.

What is claimed is:

1. A fuel cell in combination with a rejuvenation control means for rejuvenating said fuel cell while connected to an operational load as energy source therefor comprising, voltage divider means electrically connected across the output of said fuel cell including Zener diode means for establishing a reference voltage drop across a portion of said voltage divider, first resistance means, and a second resistance means connected in series therewith such that the voltage drop across said second resistance means is proportional to the output voltage of said fuel cell, third resistance means electrically connected in series with said operational load across the output of said fuel cell such that the voltage drop across said third resistance means is proportional to the load current through said operational load, tuned circuit oscillator means including tunnel diode switching means, said second resistance means and said third resistance means serially connected in the oscillation current loop path, said tunnel diode switching means being responsive to a predetermined voltage thereacross and adapted to conduct current in both forward and reverse directions at and above said predetermined voltage and to interrupt current flow in one selected direction below said predetermined voltage, said oscillator means having impedance values such that the tuned circuit oscillates when said tunnel diode is conductive in both directions, said voltage drop across said second resistance means when said fuel cell is functioning within predetermined limits on its voltage-work function characteristic curve at the no load current point thereon, being at least said predetermined voltage such that said oscillator means oscillates, fuel cell reactant supply means, means connecting said oscillator means to said fuel cell reactant supply means such that said supply means is responsive to the operational state of said oscillator means to introduce reactant into said fuel cell in the absence of the oscillation thereof.

2. A fuel cell rejuvenation control means in the combination as defined in claim 1 wherein said voltage divider means includes means for suppressing spurious voltage deviations electrically connected in series with said Zener diode means, said first resistance means and said second resistance means.

3. A fuel cell rejuvenation control means in the combination as defined in claim 2 wherein said means connecting said oscillator means to said fuel cell reactant supply means includes means for converting the output of said oscillator means into a DC voltage signal of selected polarity and said fuel cell reactant supply means responsive to said DC voltage signal.

References Cited

UNITED STATES PATENTS

| 3,268,364 | 8/1966 | Cade et al. | 136—86 |
| 3,389,018 | 6/1968 | Dowgrallo | 136—86 |

WINSTON A. DOUGLAS, Primary Examiner

H. A. FEELEY, Assistant Examiner